US006323939B1

(12) United States Patent
Suzuki

(10) Patent No.: US 6,323,939 B1
(45) Date of Patent: Nov. 27, 2001

(54) IMAGE FORMING APPARATUS WITH A RE-FEEDING PATH FOR DUPLEX COPYING HAVING WAITING POSITION THEREIN

(75) Inventor: Kenji Suzuki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,373

(22) Filed: Jun. 24, 1999

(30) Foreign Application Priority Data

Jun. 30, 1998 (JP) .................................................. 10-185277
Mar. 12, 1999 (JP) .................................................. 11-067402

(51) Int. Cl.<sup>7</sup> ........................... G03B 27/00; G03B 27/32; G03B 27/52
(52) U.S. Cl. ................................ 355/407; 355/24; 355/23
(58) Field of Search ............................ 355/407, 27, 100, 355/319, 24, 23; 358/453, 452, 448

(56) References Cited

U.S. PATENT DOCUMENTS 4,367,948  1/1983  Suzuki ................................ 355/14 D
5,774,204  6/1998  Suzuki et al. ......................... 355/27

FOREIGN PATENT DOCUMENTS 4-28675  1/1992  (JP) .

Primary Examiner—Russell Adams
Assistant Examiner—Peter B. Kim
(74) Attorney, Agent, or Firm—Fitzpatrick, Cella, Harper & Scinto

(57) ABSTRACT

An image forming apparatus according to the present invention includes two deck cases (sheet stacking means) arranged side by side and disposed below a re-feed path for re-feeding a sheet having a first surface on which an image was formed. In the present invention, a sheet feed path of the deck case, among two deck cases, remote from a registration introduction path is joined to an intermediate portion of the re-feed path.

3 Claims, 8 Drawing Sheets

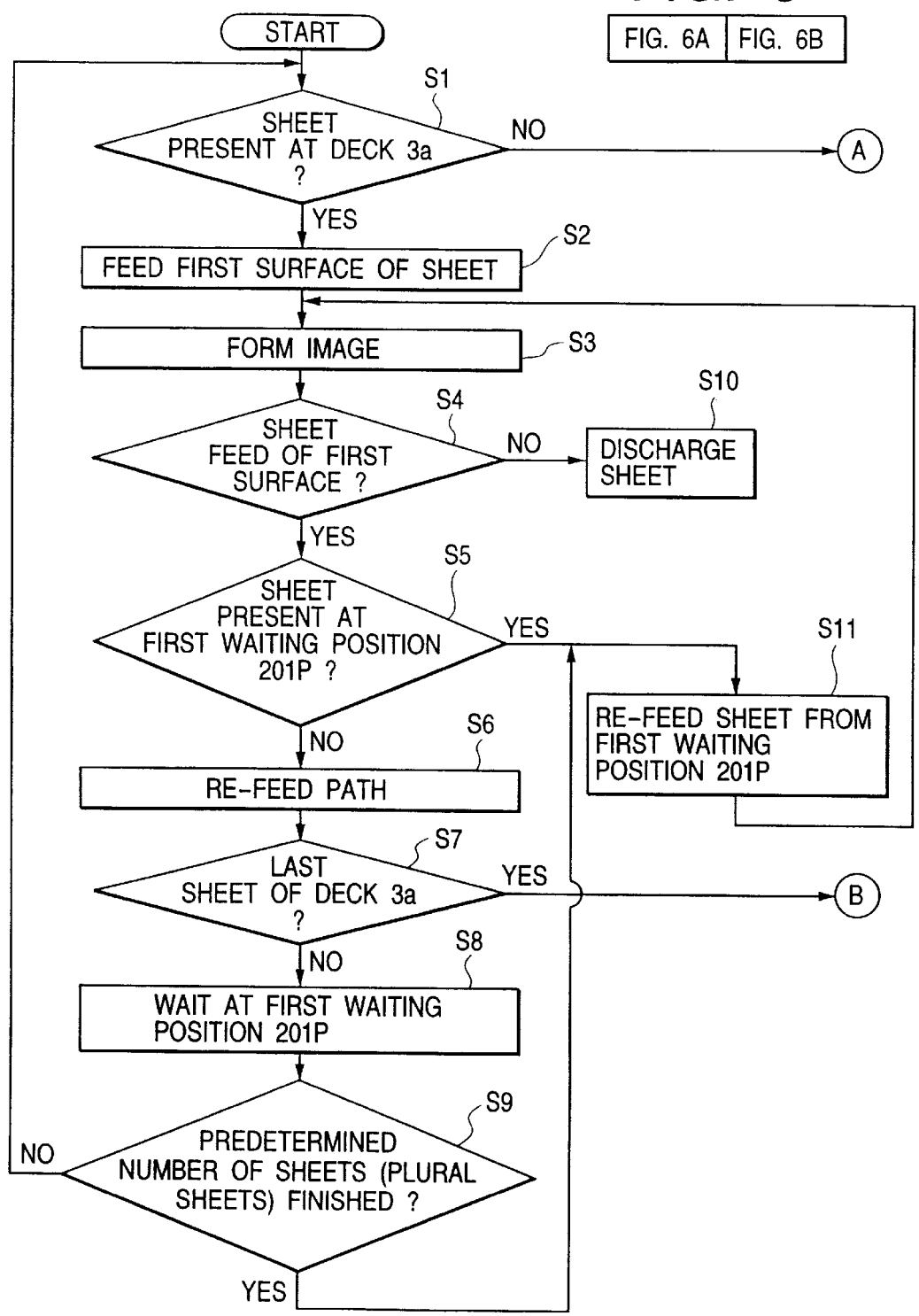

IMAGE FORMING APPARATUS WITH A RE-FEEDING PATH FOR DUPLEX COPYING HAVING WAITING POSITION THEREIN

BACKGROUND OF THE INVENTION

1. Field of the Invention

The present invention relates to an image forming apparatus such as a copying machine, a printer, a facsimile and the like, and more particularly, it relates to an image forming apparatus having a sheet re-feeding apparatus for re-feeding a sheet to permit formation an image on a second surface of the sheet having a first surface on which an image was already formed.

2. Related Background Art

In the past, image forming apparatuses such as copying machines, printers, facsimiles and the like, having a both-face mode for forming images on both surface of a single sheet are already known.

FIG. 7 shows an entire construction of a conventional image forming apparatus having a both-face mode.

At left and right parts of a lowermost portion of a main body 2 of an image forming apparatus 1, there are provided deck cases (sheet stacking means) 3a, 3b disposed side by side. For example, these deck cases 3a, 3b are capable of containing of about 1500 small size sheets (such as A4 size sheets) which are frequently used.

In FIG. 7, sheets P in the right deck case 3a are supplied and separated at a sheet supply portion 31a, and the separated sheet is directed into a registration introduction path (sheet convey path) 5b through a sheet feed path 5d.

In FIG. 7, sheets P in the left deck case 3b are supplied and separated at a sheet supply portion 31b, and the separated sheet is directed into the registration introduction path 5b through a sheet feed path 5a.

The sheet P introduced into the registration introduction path 5b is passed through an introduction path 5c and is conveyed to an image forming portion (transfer portion) 11 through a pair of registration rollers 10.

The sheet P on which an image was formed (transferred) in the image forming portion 11 is conveyed to a fixing device 15 through a convey portion 13. In the fixing device 15, heat and pressure are applied to the sheet to fix a toner image to the sheet P.

A pair of sheet discharge rollers 17 are disposed at a downstream side of the fixing device 15. A flapper 16 for switching the sheet P having a first surface on which the image was formed toward a reversing introduction path 18 is disposed between the fixing device and the pair of sheet discharge rollers 17.

In a both-face mode, after the image was formed on the first surface of the sheet, the sheet P is guided into the reversing introduction path 18 by the flapper 16, and the reversing a front surface and a rear surface of the sheet is effected in a reversing portion 19, and then, the sheet is conveyed to a re-feed path 20. When the sheet P is entered into the re-feed path 20, the sheet was turned over.

The sheet P is conveyed through the re-feed path 20. When a leading end of the sheet P reaches a sheet sensor 20b, the fact that the sheet P reached an end of the re-feed path 20 is detected by the sheet sensor 20b.

As a result, command is emitted from a control means (not shown) to a drive means (not shown) of the re-feed path 20, so that the drive means is temporarily stopped to temporarily stop the sheet P at a waiting position 20p spaced apart from the sheet sensor 20b by several ten millimeters in a downstream direction. Thereafter, the sheet P having the first surface on which the image was formed is fed into the registration introduction path 5b again through a junction 5bj to the registration introduction path 5b at a predetermined timing after a new sheet P was supplied from the sheet feed path 5a or 5d.

Thereafter, similar to the formation of the image on the first surface, an image is formed on a second surface of that sheet P, and then, the sheet is discharged out of the image forming apparatus by the pair of sheet discharge rollers 17. In this way, the image forming apparatus 1 shown in FIG. 1 can form the images on both surfaces of the sheet P.

The image forming apparatus 1 serves to alternately send a sheet P fed from the deck 3a and having a first surface on which an image is to be formed and a sheet fed from the re-feed path 20 and having the first surface on which the image was formed to the image forming portion 11. That is to say, the sheet P having the first surface on which the image is to be formed and the sheet P having the first surface on which the image was formed and the second surface on which the image is to be formed are alternately introduced into the registration introduction path 5b (this is referred to as "alternate feeding" hereinafter).

Accordingly, the flapper 16 can effect the re-feed guide of the sheet having the first surface on which the image was formed and the second surface on which the image is to be formed and the discharge guide of the sheet P having both surfaces on which the images were formed alternately for each sheet.

Incidentally, above the reversing portion 19 and the re-feed path 20, there are disposed cassettes 4b, 4a (stacked vertically) capable of selectively containing large size sheets (such as A3 size sheets) and small size sheets (such as A4 size sheets). For example, the cassettes 4b, 4a can contain about 500 sheets P.

By the way, in case of the above-mentioned conventional image forming apparatus 1, a both-face unit 21 including the reversing portion 19 and the re-feed path 20, and the sheet feed path 5a for the left deck case 3b are designed so that they can be retracted forwardly (toward a front side of the main body) independently.

Thus, if the sheet P is jammed, when the jam treatment is being effected by retracting either the both-face unit 21 or the sheet feed path 5a, the other cannot be retracted for the jam treatment.

That is to say, the conventional image forming apparatus 1 has a disadvantage that the sheet feed path 5a and the both-face unit 21 cannot be retracted simultaneously.

Further, comparing the installation position of the left deck case 3b with the installation position of the right deck case 3b with respect to the waiting position 20p for the sheet P to be re-fed, since the left deck case 3b is more spaced apart from the waiting position than the right deck case, when the alternate feeding is effected by using the left deck case 3b, the stopping time of the re-fed sheet P is increased accordingly.

Accordingly, in the conventional image forming apparatus 1, in the case where the small size sheets (such as A4 size sheets) in the deck case are copied by several hundred sheets, when the sheets P in the right deck case 3a are copied, since the sheets can be copied with substantially the same sheet-to-sheet interval, the both-face copying productivity is good, but, when the sheets P in the left deck case 3b are copied, the sheet-to-sheet interval (sheet interval) is increased, with the result that the both-face copying productivity is worsened.

To solve this problem, it is considered that a conveying speed of the sheet P supplied from the left deck case 3b. In this case, however, it is required that the conveying speed must be increased by several times in order to make the sheet-to-sheet interval for the sheets supplied from the left deck case substantially the same as the sheet-to-sheet interval for the sheets supplied from the right deck case 3a, with the result that control becomes complicated and/or conveying performance becomes unstable.

Accordingly, an object of the present invention is to provide an image forming apparatus in which (1) a re-feed path and a sheet feed path can be retracted simultaneously, and (2) even when a sheet is fed either one of sheet stacking means arranged side by side, a both-face image processing time for the sheet becomes substantially the same, and any loss of productivity does not occur in feed position switching.

SUMMARY OF THE INVENTION

To achieve the above object, the present invention relates to an image forming apparatus comprising a plurality of sheet stacking means for stacking sheets, a plurality of sheet feed paths associated respectively with each of the corresponding sheet stacking means and each adapted to convey the sheet fed from the corresponding sheet stacking means, a sheet convey path connected to the plurality of sheet feed paths and adapted to convey the sheet fed from each of the sheet feed paths to an image forming portion for forming an image, a reversing portion for reversing a front surface and a rear surface of the sheet having a first surface on which the image was formed in the image forming portion, and a re-feed path for supplying the sheet surface-reversed by the reversing portion to the sheet convey path, and a sheet having a first surface on which an image is to be formed later and the sheet having the first surface on which the image was formed and a second surface on which an image is to be formed are alternately fed into the sheet convey path.

To achieve the above object, the present invention is characterized in that some of the plurality of sheet stacking means are sheet stacking means disposed in parallel to each other, and the sheet feed path of at least one sheet stacking means among the some of the sheet stacking means is joined to the re-feed path so that a part of the re-feed path at a downstream side of a junction is used commonly.

For example, two sheet stacking means may be disposed in parallel to each other, and the sheet feed path of one sheet stacking means among them may be joined to the re-feed path. Preferably, the sheet feed path of the sheet stacking means (among two sheet stacking means) remote from the sheet convey path is joined to the re-feed path. The sheets fed from two sheet stacking means have substantially same sheet interval.

Further, in the present invention, the image forming portion, the re-feed path and the sheet stacking means disposed in parallel to each other may be installed in order from the above.

Furthermore, in the present invention, the reversing portion, the re-feed path and the sheet feed path joined to the re-feed path may be formed as a unit and can be retracted.

In addition, the present invention is characterized in that a waiting means for waiting the sheet having the first surface on which the image was formed on the re-feed path are disposed at an upstream side of the re-feed path in such a manner that the waiting means and the junctions are alternately arranged on the re-feed path, starting from the waiting means, and there is provided a waiting control means for controlling in such a manner that, when the sheet is fed from any one of the sheet feed paths, the waiting means at the upstream side of the any sheet feed path is operated to effect an waiting operation. For example, each sheet waiting position is located between the waiting means and the sheet feed path adjacent to the waiting means at a downstream side thereof. Among the plurality of waiting means, a most downstream waiting means is disposed in the vicinity of a downstream end of the re-feed path.

The image forming apparatus according to the present invention is capable of forming the images on both surfaces of the sheet.

The sheet fed out from the selected sheet stacking means and having the first surface on which the image is to be formed is fed to the image forming portion either through the sheet feed path and the sheet convey path or through a shorter sheet feed path, a part of the re-feed path and the sheet convey path. When the sheet is sent to the image forming portion, the image is formed on the first surface of the sheet.

Thereafter, the sheet is sent to the reversing portion, where the sheet is surface-reversed (reversing the front surface and the rear surface of the sheet) so that the image can also be formed on the second surface, and then, the sheet is fed into the image forming portion again through the re-feed path and the sheet convey path.

After the image was formed on the second surface of the sheet, the sheet is discharged out of the image forming apparatus.

In a flow of the sheet in the above-mentioned processes, when the sheet is sent to the image forming portion through the shorter sheet feed path, the part of the re-feed path and the sheet convey path, since the part of the re-feed path also acts as the sheet feed path, if the sheet is jammed, by retracting the re-feed path, the sheet feed path can be retracted by itself. Thus, in comparison with the conventional case in which the re-feed path and the sheet feed path are retracted independently, the jammed sheet can easily be removed. Further, when the part of the re-feed path also acts as the sheet feed path, the sheet feed path can be shortened accordingly, thereby reducing the entire height of the image forming apparatus.

Further, in a flow of the sheet in the above-mentioned processes, the left sheet stacking means and the right sheet stacking means can effect both-face copying operation with substantially the same sheet-to-sheet interval.

Furthermore, when a large amount of copies are obtained, if the sheets in one of the sheet stacking means are used up, although the sheet feeding is automatically switched to the other stacking means, since the sheet-to-sheet interval is substantially the same, both-face copying can be effected smoothly.

In addition, in a flow of the sheet in the above-mentioned processes, when the sheet having the first surface on which the image was formed sent into the sheet convey path through the reversing portion and the re-feed path, if a new sheet is fed from the sheet stacking means, the sheet having the first surface on which the image was formed is waited at the upstream side of the sheet feed path by the waiting means, thereby preventing interference with the new sheet.

Further, when the image forming portion, re-feed path and sheet stacking means are arranged along the vertical direction in order from the above, the re-feed path and the sheet stacking means are disposed in the vicinity of the image forming apparatus, so that a length of the path for conveying the sheet is shortened. As a result, the image forming apparatus can effect the image formation quickly.

DESCRIPTION OF THE PREFERRED EMBODIMENTS

Figure 1:
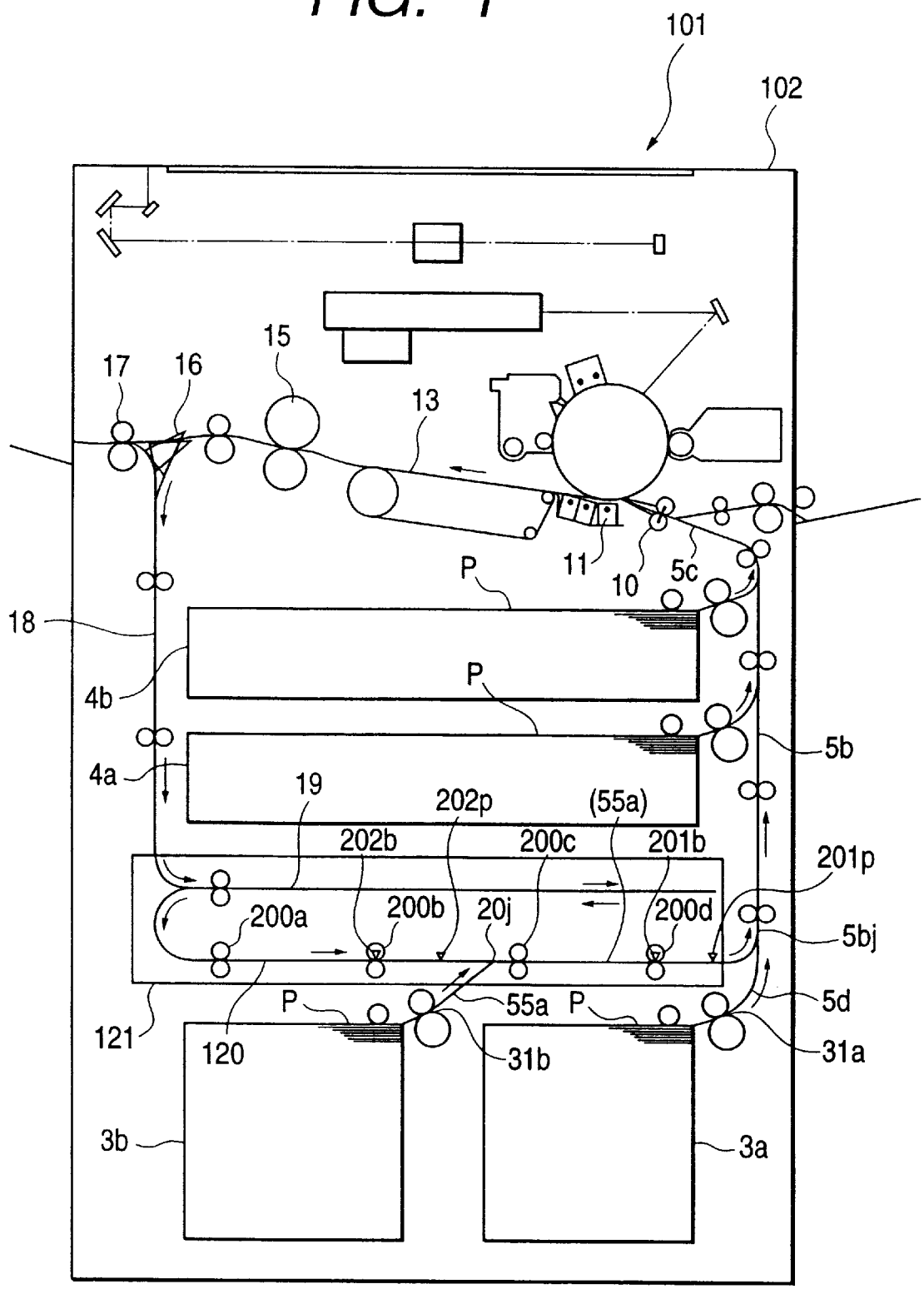
FIG. 1 is a sectional view of an image forming apparatus according to a first embodiment of the present invention.

The present invention will now be explained in connection with embodiments thereof.

Incidentally, in various embodiments, the same elements as those of the conventional ones (FIG. 7) are designated by the same reference numerals and explanation thereof will be omitted.

First Embodiment

An image forming apparatus according to a first embodiment of the present invention will be described with reference to FIG. 1.

At a lowermost position of a main body 102 of an image forming apparatus 101, a plurality of deck cases 3a, 3b capable of stacking for example about 1500 sheets P are disposed side by side (along a left-and right direction in FIG. 1) and in series with a registration introduction path 5b.

A sheet P on which an image was formed in an image forming portion 11 is sent, through a convey portion 13, to a fixing device 15, where a toner image is fixed to the sheet.

In a both-face mode, after the fixing, the sheet P is guided by a flapper 16 to be sent into a reversing introduction path 18. After a front surface and a rear surface of the sheet P is reversed in a reversing portion 19, the sheet is sent into a re-feed path 120.

The sheet P conveyed through the re-feed path 120 is conveyed into the registration introduction path 5b through a junction 5bj to reach a pair of registration rollers 10.

The sheet P supplied from the deck case remote from the registration introduction path 5b (i.e., left deck case 3b) among the plurality of deck cases 3a, 3b disposed below the re-feed path 120 is fed through a sheet feed path 55a.

The sheet feed path 55a is joined to an intermediate portion of the re-feed path 120 at a junction 20j. Accordingly, a path from the junction 20j of the re-feed path 120 to the junction 5bj is associated with both the sheet feed path 55a and the re-feed path 120.

The reversing portion, the re-feed path 120 and a part of the sheet feed path 55a are formed as a box-shaped unit (121) which can be retracted toward a front side of the main body of the apparatus. Thus, if the sheet is jammed in the both-face unit 121, the jammed sheet can be removed easily and quickly by retracting the both-face unit 121.

Figure 7:
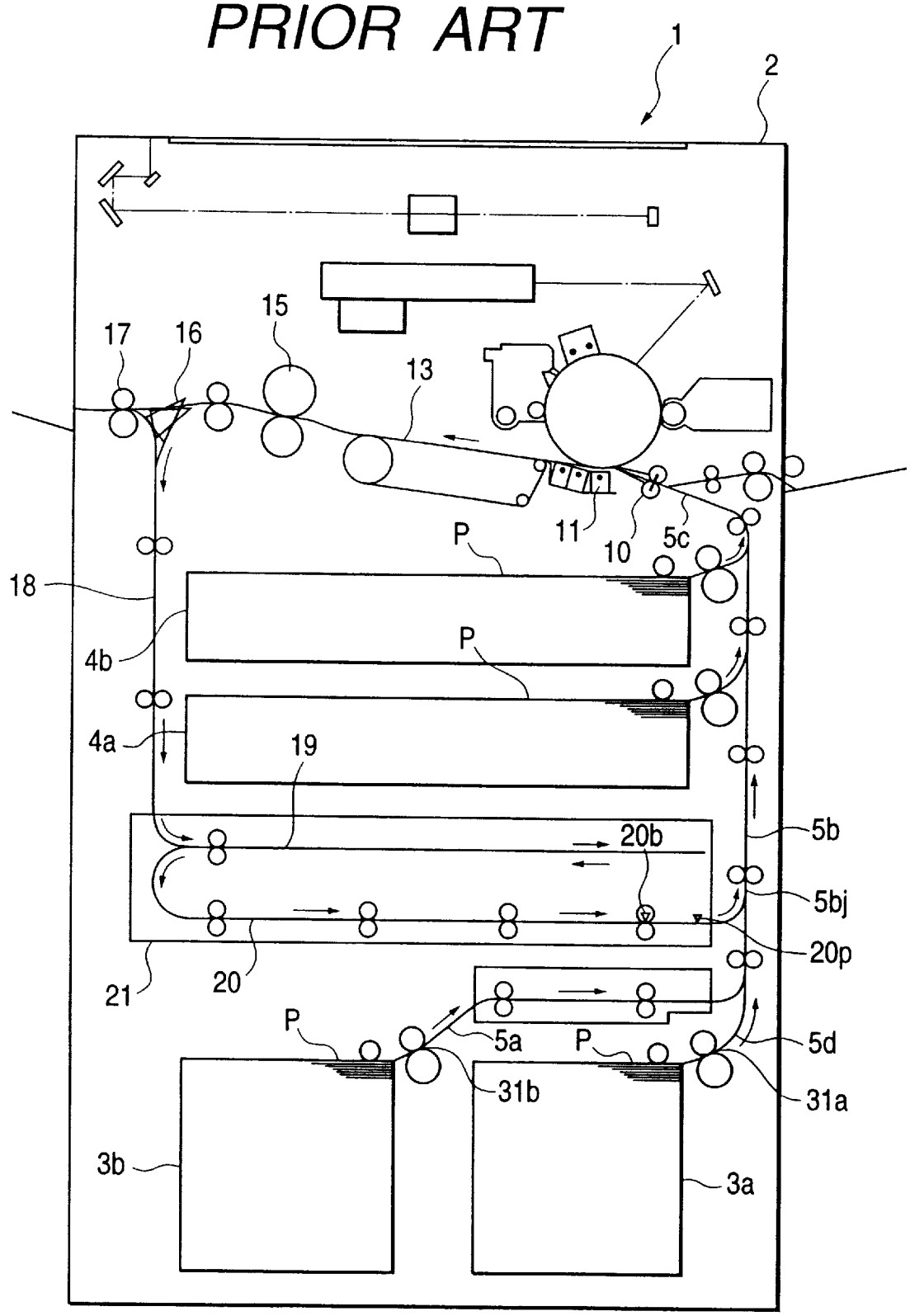
FIG. 7 is a sectional view of a conventional image forming apparatus.

As mentioned above, by joining the sheet feed path 55a to the re-feed path 120 to use the re-feed path and sheet feed path commonly, unlike to the sheet feed path 5a of the conventional image forming apparatus 1 shown in FIG. 7, the sheet feed path 55a is made more shorter, so that the jam treatment can be facilitated and a height of the main body 102 of the image forming apparatus can be decreased.

Second Embodiment

Figure 2:
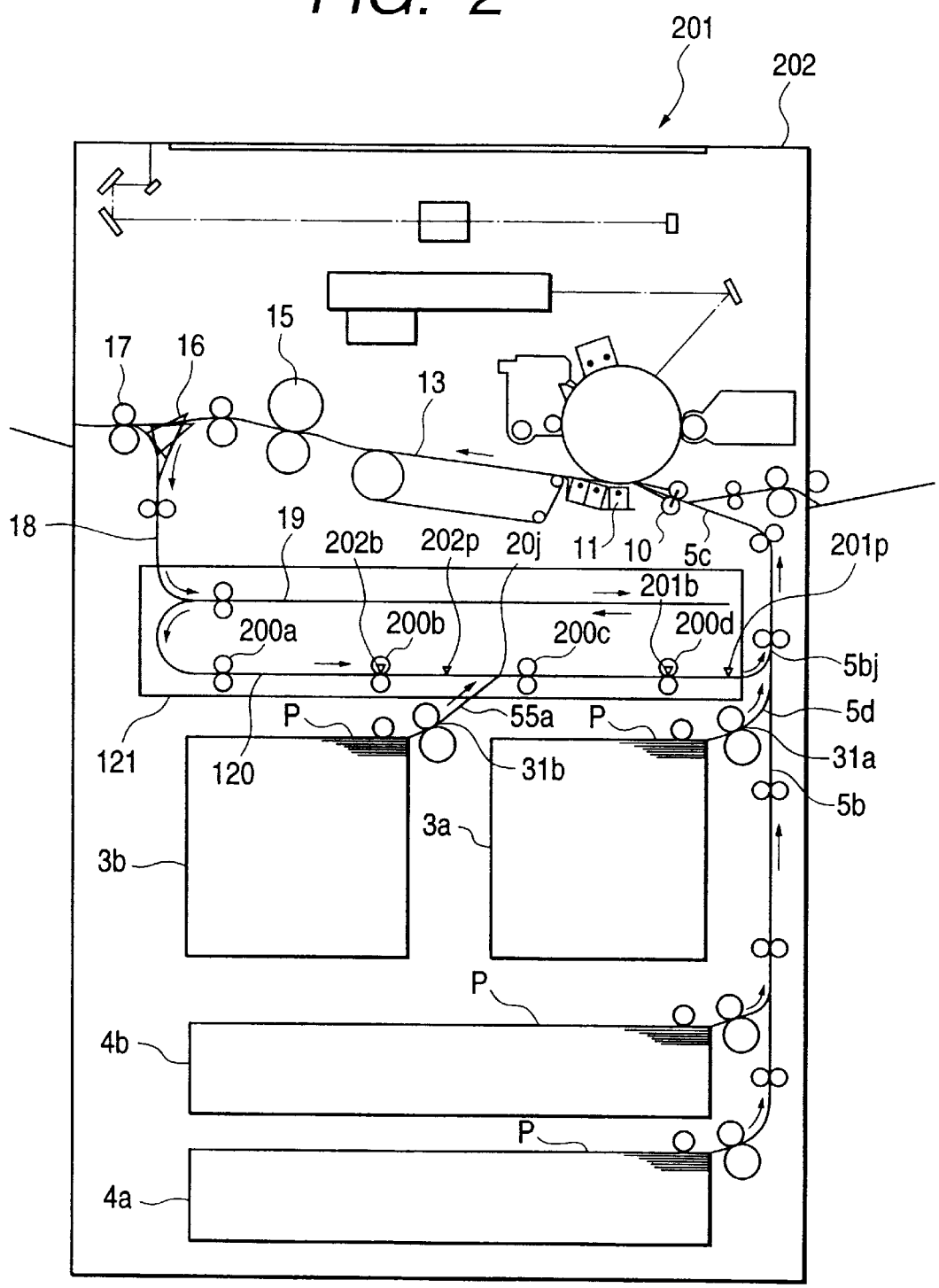
FIG. 2 is a sectional view of an image forming apparatus according to a second embodiment of the present invention.

Next, an image forming apparatus according to a second embodiment of the present invention will be explained with reference to FIG. 2.

In an image forming apparatus 201 according to the second embodiment, the image forming portion 11, both-face unit 121, deck cases 3a, 3b and cassettes 4a, 4b are arranged vertically in order from the above within a main body 202 of the image forming apparatus.

By arranging the both-face unit 121 associated with the deck cases 3a, 3b in the vicinity of the lower side of the image forming portion 11 as mentioned above, a path between the deck cases 3a, 3b and the image forming portion 11 can be made shorter, so that, when image processing is effected regarding a large number of sheets, processing efficiency of the image forming apparatus can be improved.

(Sheet waiting control portion of image forming apparatuses of first and second embodiments)

Figure 3:
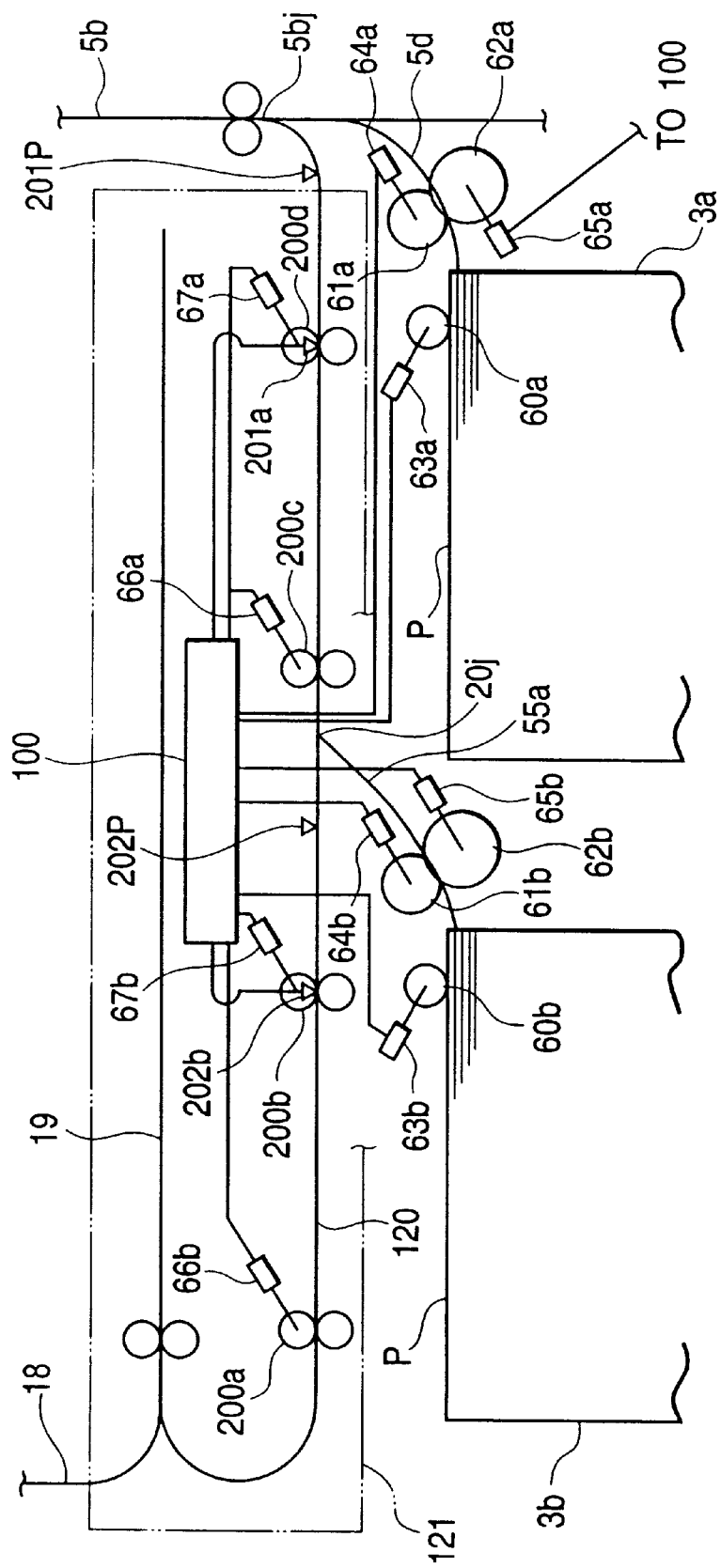
FIG. 3 is a sectional view of a sheet waiting control portion of the image forming apparatuses of the first and second embodiments of the present invention.

Next, in the image forming apparatuses 101, 201 according to the first and second embodiments, a control portion for waiting the sheet P will be explained with reference to FIG. 3.

The sheet P having a first surface on which the image was formed is introduced into the reversing introduction path 18. Then, the front surface and the rear surface of the sheet P is reversed in the reversing portion 19, and then, the sheet is sent into the re-feed path 120. When a leading end of the sheet P sent in the re-feed path 120 is detected by a sheet sensor 202b, if a motor 63b for a pick-up roller 60b of the deck case 3b and motors 64b, 65b for a pair of separation rollers 61b, 62b are being rotated to feed out the sheet P from the left deck case 3b, a waiting control means 100 stops motors 66b, 67b for convey rollers 200a, 200b when a predetermined time period is elapsed after the sheet detection. As a result, the sheet P having the first surface on which the image was formed is stopped at a second waiting position 202p spaced apart from the junction 20j by about 10 mm at an upstream side thereof and is waiting there. Accordingly, when the sheet P in the re-feed path 120 and the sheet P from the deck case 3b are fed alternately, interference between the sheets can be avoided.

Then, when the feeding of the sheet P from the left deck case 3b is completed, the waiting control means 100 drives the motors 66b, 67b and also drives motors 66a, 67a for convey rollers 200c, 200d to convey the sheet P waiting at the second waiting position 202p to the junction 5bj.

Further, when the sheet P from the reversing portion 19 is fed into the re-feed path 120 and is detected by a sheet sensor 201a, if a motor 63a for a pick-up roller 60a of the deck case 3a and motors 64a, 65a for a pair of separation rollers 61a, 62a are being rotated to feed out the sheet P from the right deck case 3a, the waiting control means 100 stops motors 66a, 67a for the convey rollers 200c, 200d when a predetermined time period is elapsed after the detection of the sheet P. As a result, the sheet p having the first surface on which the image was formed is stopped at a first waiting position 201p spaced apart from the junction 5bj by about 10 mm at an upstream side thereof and is waiting there.

Accordingly, when the sheet P in the re-feed path 120 and the sheet P from the deck case 3a are fed alternately, interference between the sheets can be avoided.

When the feeding of the sheet P from the right deck case 3a is completed, the waiting control means 100 drives the motors 66a, 67a to convey the sheet P waiting at the first waiting position 201p to the junction 5bj.

The sheet P conveyed to the junction 5bj is sent, through the registration introduction path 5b, to the image forming portion 11, where the image is formed on the second surface of the sheet. Then, the sheet is sent to the fixing device 15, where the image is fixed to the sheet. Thereafter, the sheet is discharged out of the main body of the image forming apparatus.

Thus, the sheet feed path 55a for the left deck case 3b can be made shorter than the conventional sheet feed path 5a, the waiting time of the sheet P having the first surface on which the image was formed at the re-feed path 120 can be made shorter, and the processing time of the image forming apparatus for forming the images on both surfaces of the sheet P can be shortened.

Figure 4:
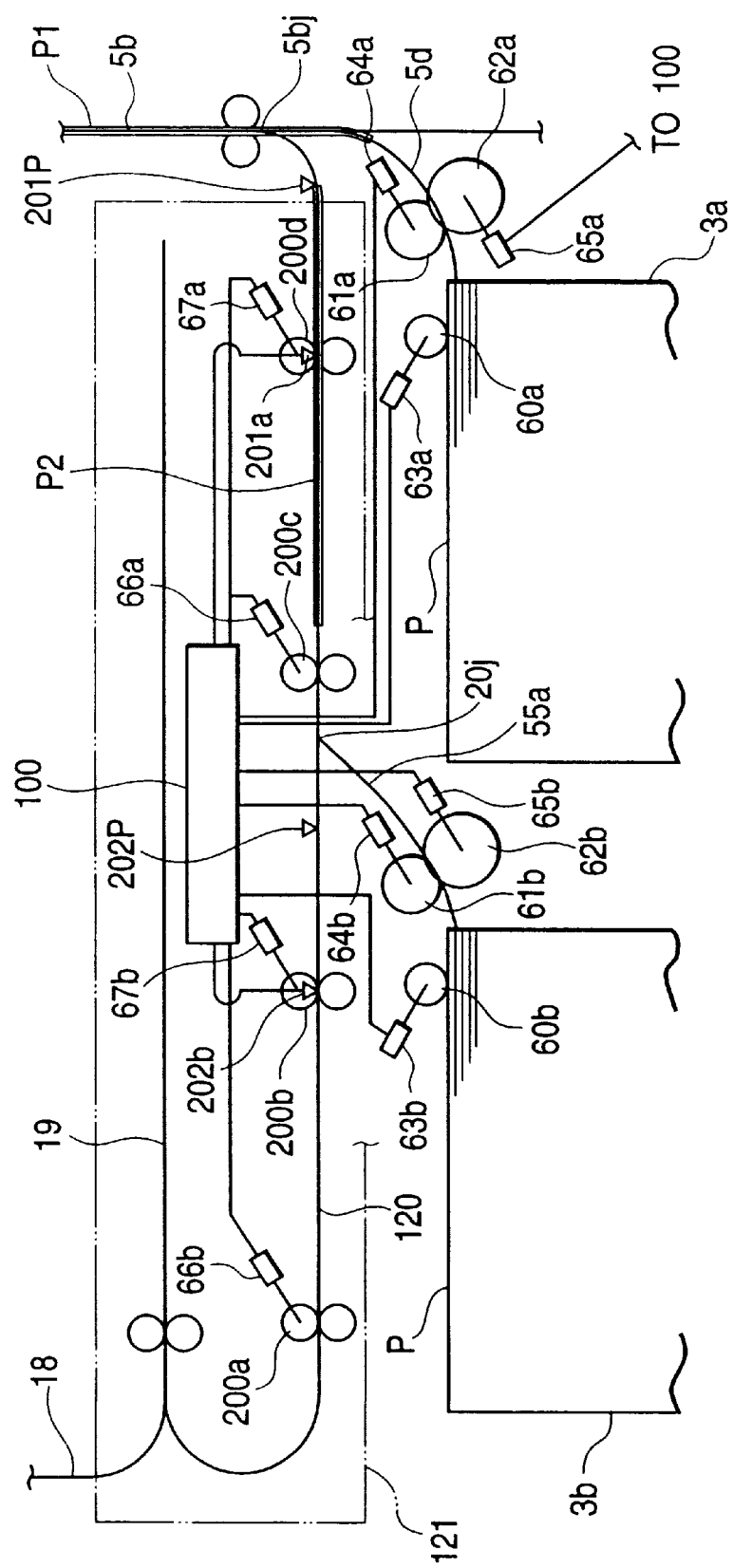
FIG. 4 is a sectional view showing arrangement of sheets upon automatic feeding position switching in a both-face copying mode.

Next, automatic feeding position switching in both-face copying of a large amount of sheets will be explained with reference to FIGS. 4 and 5.

Among the deck cases 3a, 3b disposed side by side, normally, the right deck case 3a nearer to the image forming portion 11 is preferential. The copying operation is started by using the right deck case 3a. After a final sheet p1 is fed from the deck case 3a, a sheet P2 having the first surface on which the image was formed and waiting at the first waiting position 201p is conveyed with the same sheet-to-sheet interval l as the sheet-to-sheet interval between the sheet P1 and a preceding sheet (not shown) (FIG. 4).

Figure 5:
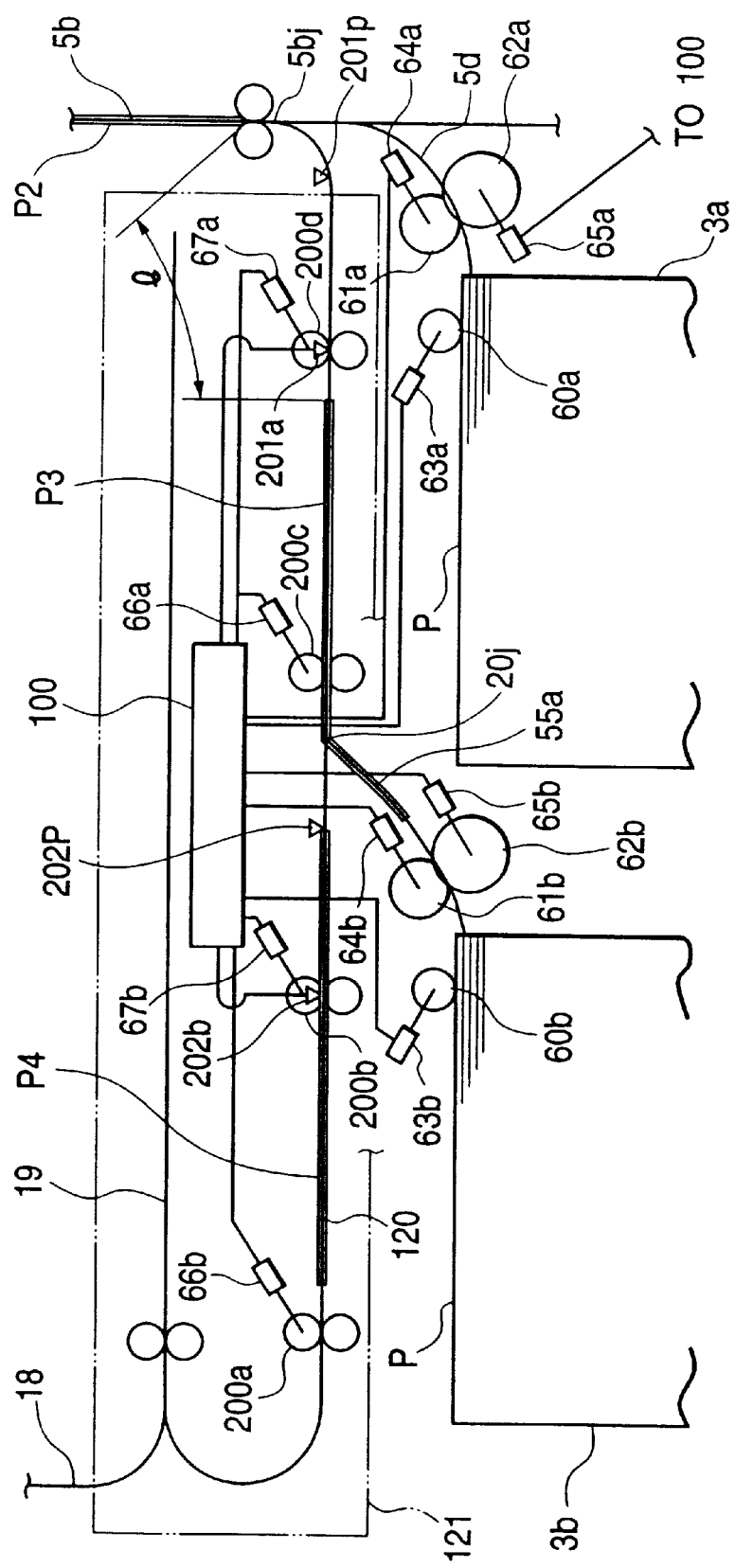
FIG. 5 is a sectional view showing arrangement of sheets upon automatic feeding position switching in a both-face copying mode.

Then, the feeding position is automatically switched to the left deck case 3b, and a sheet P3 fed from the deck case 3b is sent while keeping the sheet-to-sheet interval l regarding the preceding sheet P2 (FIG. 5). Then, a sheet P4 having the first surface on which the image was formed and waiting at the second waiting position 202p is conveyed with the sheet-to-sheet interval l regarding the preceding sheet P3. After this, the feeding is being effected from the left deck case 3b, the sheets to be re-fed are waited at the second waiting position 202p. After the sheets P in the left deck case 3b are used up, when the sheets are stacked in the right deck cases 3a, the copying operation is continued while maintaining the sheet-to-sheet interval l in an opposite manner, and the waiting position of the sheet P having the first surface on which the image was formed becomes the first waiting position 201p.

By repeating the above-mentioned operation, the both-face copying operation can be effected in an endless manner without reducing productivity, thereby improving the productivity greatly.

Figure 6B:
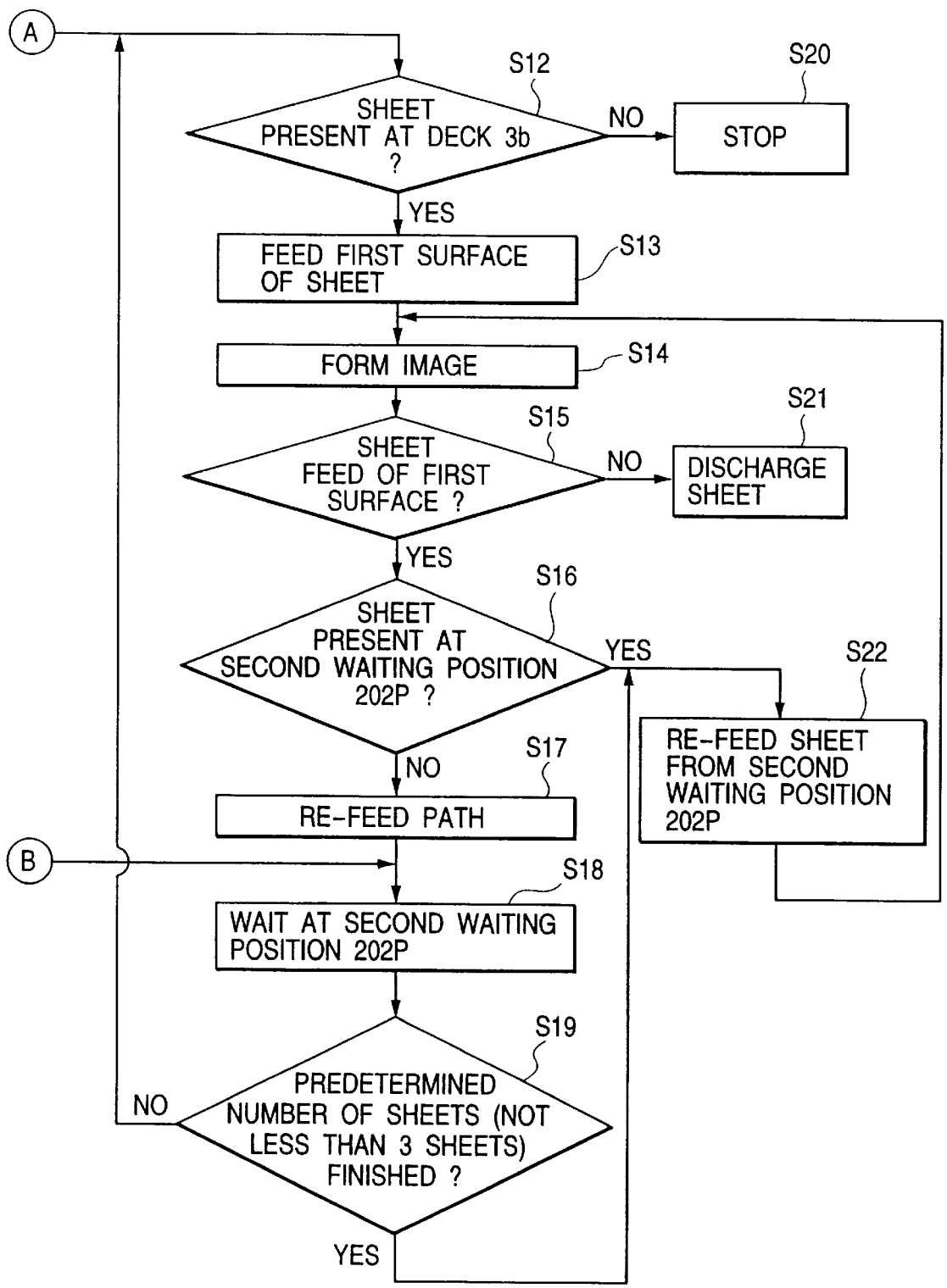
FIG. 6 is comprised of FIGS. 6A and 6B showing flow charts for explaining a sheet feeding operation of the image forming apparatus according to the present invention.

FIGS. 6A and 6B show flow charts explaining a feeding operation of the control portion. Incidentally, an image on an original is read by a known image reading device and is stored in a memory. Images stored in the memory are sent to the image forming apparatus according to the present invention and are successively recorded on both surfaces of the sheets.

This example shows a flow chart when images are formed on both surfaces of plural sheets.

For example, an example that images for four pages are formed on both surfaces of two sheets by the image forming apparatus according to the present invention will be described.

First of all, a first sheet P1 is fed from the right deck case 3a (steps S1 and S2), and an image for a first page is formed on a first surface of the sheet P1 in the image forming portion 11 (step S3). The sheet P1 having the first surface on which the image was formed is conveyed into the re-feed path 120 through the reversing portion 19 (steps S4, S5 and S6) and is waited at the first waiting position 201p (steps S7 and S8).

Then, a second sheet P2 is fed from the deck 3a (steps S9, S1 and S2), and an image for a third page is formed on a first surface of the sheet P2 (step S3). When the image was formed on the first surface of the sheet P2, since the sheet P1 is waiting at the first waiting position 201p (step S5), when a predetermined time period is elapsed after the feeding of the sheet P2 was started, the sheet P1 waiting at the first waiting position 201p is conveyed to the junction 5bj (step S11). That is to say, the above-mentioned alternate feeding is effected. After the sheet P1 was conveyed to the junction 5bj, the sheet P2 having the first surface on which the image was formed is conveyed to the re-feed path 120 through the reversing portion 19 (steps S4, S5, S6 and S7). Then, the sheet P2 is waited at the first waiting position 201p (step S8).

On the other hand, regarding the sheet P1 previously conveyed from the first waiting position 201p to the junction 5bj, an image for a second page is formed on a second surface of the sheet P1 (step S3). Then, the sheet P1 having both surfaces on which the images were formed is discharged onto a discharge tray (not shown) by the pair of sheet discharge rollers 17 (steps S4 and S10).

Since the sheet P2 waiting at the first waiting position 201p is a sheet on which an image for the last page of the original is to be recorded, when a predetermined time period is elapsed after the previous sheet Pl was re-fed, the sheet P2 waiting at the first waiting position 201p is conveyed to the junction 5bj (steps S9 and S11), and an image for a fourth page is formed on a second surface of the sheet P2 (step S3). The sheet P2 having both surfaces on which the images were formed is discharged onto the discharge tray (steps S4 and S10). In this way, the both-face print regarding four pages is completed.

In the above-mentioned embodiment, while an example that the images are formed on both surfaces of two sheets was explained, when images are formed on both surfaces of three or more sheets, the similar process can be used.

Then, after the sheets in the right deck case 3a are used up, when the feeding is effected from the left deck case 3b, although the print can be effected in the same manner as the above by using the steps S12 to S22, a sheet fed from the left deck case 3b and having a first surface on which the image was formed is waited at the second waiting position 202p. Accordingly, by alternately feeding a sheet fed from the left deck case 3b and having a first surface on which an image is to be formed later and the sheet waiting at the second waiting position 202p and having a second surface on which an image is to be formed later with a constant sheet-to-sheet interval, both-face print can be achieved for a shorter time.

By the way, when the sheet fed from the right deck case 3a is a final sheet P', by the steps S7 and S17, the final sheet P' is waited at the second waiting position 202p. Thereafter, the sheet P' is alternately fed with the sheet fed from the left deck case 3b.

In the above-mentioned embodiment, while an example that the single sheet is waiting in the re-feed path 120 was explained, sheets may be waited at a plurality of waiting positions, respectively. For example, when the feeding is effected from the right deck case 3a, the sheets having the first surfaces on which the images were formed are waited at the first waiting position 201p and the second waiting position 202p, respectively, and, by alternately feeding these waiting sheets with the sheets fed from the right deck case 3a, the both-face print can be effected efficiently at a high speed.

In the above-mentioned embodiment, while an example that two deck cases are disposed side by side was explained, three or more sheet stacking portions may be disposed side by side and feed paths from at least two stacking portions may be joined to the re-feed path.

As mentioned above, according to the present invention, since the sheet feed path of at least one sheet stacking means among the sheet stacking means disposed side by side is joined to the intermediate portion of the re-feed path to use a part of the refeed path commonly and, when the sheets in one of two sheet stacking means disposed side by side are used up, the switching to the other sheet stacking means can be effected automatically and the sheet feeding operation can be continued after the switching with keeping substantially the same sheet-to-sheet interval, the productivity of the both-face copying operation is enhanced, and such operation can be effected in an endless manner.

Further, for example, if the sheet is jammed, it is not required that the re-feed path and the sheet feed path of the sheet stacking means be retracted from the main body of the image forming apparatus simultaneously, with the result that the sheet jam treatment can be effected easily and quickly.

In addition, since at least one sheet feed path is not required to be joined to the sheet convey path, the height of the image forming apparatus can be reduced.

Furthermore, since the length of the sheet feed path to be joined to the re-feed path becomes shorter than the conventional sheet feed path, the waiting time of the sheet having one surface on which the image was formed waiting in the re-feed path becomes shorter, with the result that the processing time of the image forming apparatus for forming the images on both surfaces of the sheet can be shortened, thereby enhancing the image processing efficiency.

Lastly, when the image forming portion, re-feed path and sheet stacking means are arranged vertically in order from the above, the convey path for the sheet can be shortened to reduce the processing time, thereby enhancing the processing efficiency.

What is claimed is:

1. An image forming apparatus comprising:

a plurality of sheet stacking means for stacking sheets;

a plurality of sheet feed paths provided respectively with each of said sheet stacking means for conveying the sheet fed from said sheet stacking means;

a sheet convey path, connected to said plurality of sheet feed paths, for conveying the sheet fed from each of said sheet feed paths to an image forming portion for forming an image;

a reversing portion for reversing a front surface and a rear surface of the sheet having a first surface on which the image was formed in said image forming portion;

a re-feed path for supplying the sheet surface-reversed by said reversing portion to said sheet convey path; and waiting means for temporarily stopping and waiting the sheet having the first surface on which the image was formed at a waiting position in said re-feed path, wherein at least one waiting position is provided in said re-feed path; and wherein a sheet having a first surface on which an image is to be formed later and a sheet having a first surface on which the image was formed and a second surface on which an image is to be formed are alternately fed into said sheet convey path, wherein some of said plurality of sheet stacking means are sheet stacking means disposed in parallel to each other, and the sheet feed path of at least one sheet stacking means among said some of the sheet stacking means is joined to said re-feed path so that a part of said re-feed path at a downstream side of a junction is used commonly, wherein, in said re-feed path, a first waiting position is set at a downstream side of said junction, and a second waiting position is set at an upstream side of said junction, wherein feeding of the sheet fed from said sheet stacking portion nearer to said sheet convey path is interrupted at said first waiting position after the image is formed on the first surface of said sheet, and wherein feeding of the sheet fed from said sheet stacking portion remote from said sheet convey path is interrupted at said second waiting position after the image is formed on the first surface of said sheet.

2. An image forming apparatus according to claim 1, wherein, when there becomes no sheet in said nearer stacking means, the sheet feeding is effected from said remoter stacking means and, at this time, last sheet from the nearer stacking means waits at the second waiting position.

3. An image forming apparatus according to claim 1, wherein, in case where sheets are fed from said nearer stacking means, each of continued sheets waits at the first and second waiting position respectively.

* * * * *

UNITED STATES PATENT AND TRADEMARK OFFICE
CERTIFICATE OF CORRECTION

PATENT NO. : 6,323,939 B1
DATED : November 27, 2001
INVENTOR(S) : Kenji Suzuki

It is certified that error appears in the above-identified patent and that said Letters Patent is hereby corrected as shown below:

Column 1,
Line 11, "formation" should read -- formation of --.
Line 18, "surface" should read -- surfaces --.
Line 26, "of" should be deleted.
Line 58, "was" should read -- is --.

Column 4,
Line 4, "an" should read -- a --.
Line 63, "the" (1st occurrence) should be deleted.

Column 6,
Line 5, "more" should be deleted.
Line 34, "is" should read -- are --.
Line 64, "p" should read -- P --.

Column 7,
Line 27, "pl" should read -- Pl --.
Line 41, "waited" should read -- made to wait --.

Column 8,
Lines 4, 18, 45, 54, 59 and 62, "waited" should read -- made to wait --.

Column 9,
Line 36, "the" (1st occurrence) should be deleted.

Column 10,
Line 40, "remoter" should read -- remote --.

Signed and Sealed this

Second Day of July, 2002

*Attest:*

JAMES E. ROGAN
*Director of the United States Patent and Trademark Office*

*Attesting Officer*